United States Patent
Park et al.

(10) Patent No.: US 9,651,394 B2
(45) Date of Patent: May 16, 2017

(54) INFORMATION DISPLAYING APPARATUS AND METHOD THEREOF

(75) Inventors: Seungwook Park, Seoul (KR); Byeongmoon Jeon, Seoul (KR); Dongseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 721 days.

(21) Appl. No.: 12/903,015

(22) Filed: Oct. 12, 2010

(65) Prior Publication Data
US 2011/0106428 A1    May 5, 2011

(30) Foreign Application Priority Data

Oct. 30, 2009 (KR) .......... 10-2009-0104522
Aug. 17, 2010 (KR) .......... 10-2010-0079512

(51) Int. Cl.
*G01C 21/34* (2006.01)
*G08G 1/123* (2006.01)
*G01C 21/36* (2006.01)

(52) U.S. Cl.
CPC ..... *G01C 21/3623* (2013.01); *G01C 21/3647* (2013.01)

(58) Field of Classification Search
CPC ................................. G01C 21/3647
USPC ................................. 701/201, 208
See application file for complete search history.

(56) References Cited

U.S. PATENT DOCUMENTS

| 2004/0168148 A1* | 8/2004 | Goncalves ............. G01C 21/12 717/104 |
| 2006/0074553 A1* | 4/2006 | Foo ....................... G01C 21/367 701/431 |
| 2007/0018974 A1* | 1/2007 | Fujiwara ................ G09B 29/12 345/419 |
| 2007/0165108 A1* | 7/2007 | Yuasa ...................... B60R 1/00 348/148 |
| 2007/0208507 A1* | 9/2007 | Gotoh .................... G01C 21/30 701/414 |
| 2007/0288162 A1* | 12/2007 | Furukawa ............ G01C 21/367 701/431 |
| 2008/0147410 A1* | 6/2008 | Odinak .................. G10L 15/26 704/270.1 |
| 2009/0125234 A1* | 5/2009 | Geelen ............... G01C 21/3647 701/533 |
| 2009/0132162 A1* | 5/2009 | Kudoh .................. G01C 21/36 701/533 |

(Continued)

FOREIGN PATENT DOCUMENTS

| JP | 7-63572 A | 3/1995 |
| JP | 7-144578 A | 6/1995 |

(Continued)

*Primary Examiner* — Imran Mustafa
(74) *Attorney, Agent, or Firm* — Birch, Stewart, Kolasch & Birch, LLP

(57) ABSTRACT

An information displaying apparatus and method thereof capable of accurately displaying event information on a captured actual image are provided. The information displaying apparatus may include a controller configured to detect a location of a specific point within an image captured by a capture unit and to match event information corresponding to an event generated location on map data to the captured image based on the location of the specific point and a current location; and a display unit configured to display the matched result.

5 Claims, 9 Drawing Sheets

(56) References Cited

U.S. PATENT DOCUMENTS

2009/0319178 A1* 12/2009 Khosravy .......... G06Q 30/0241
  701/408
2010/0114478 A1* 5/2010 Bai ..................... G09B 29/102
  701/408

FOREIGN PATENT DOCUMENTS

JP    2002-127823 A    5/2002
KR    10-2008-0019690 A    3/2008

* cited by examiner

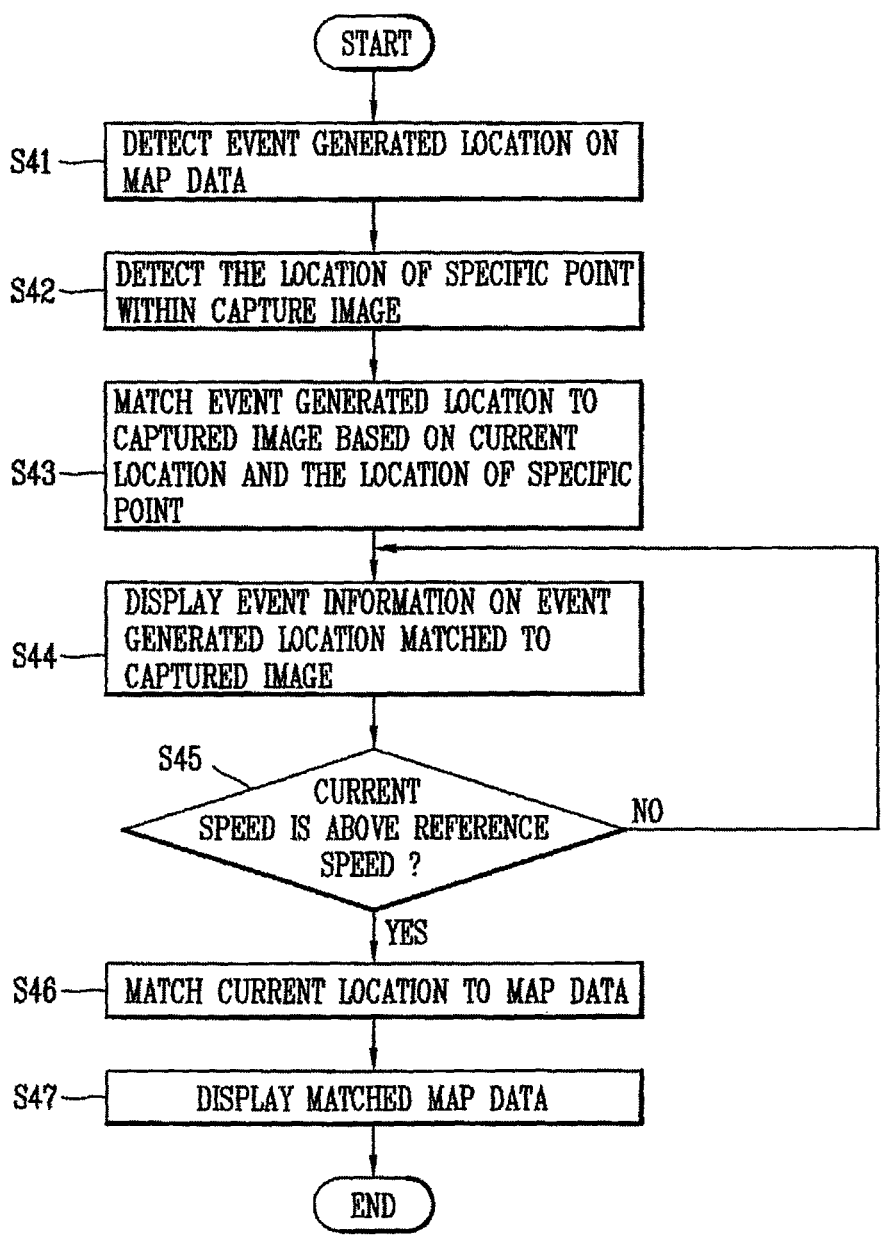

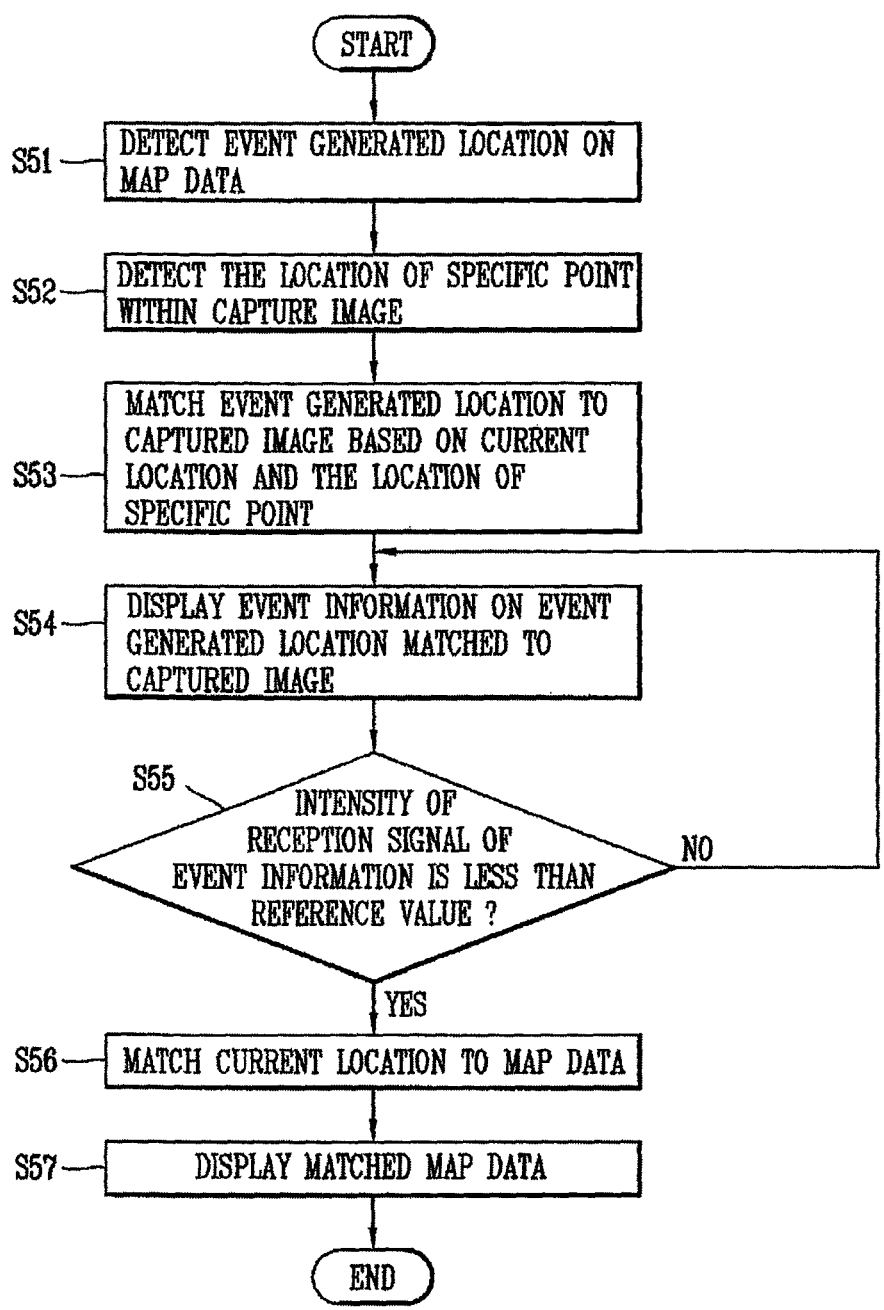

INFORMATION DISPLAYING APPARATUS AND METHOD THEREOF

CROSS-REFERENCE TO RELATED APPLICATIONS

This application claims priority to Korean Patent Application No. 10-2009-0104522, filed on Oct. 30, 2009 and Korean Patent Application No. 10-2010-0079512, filed on Aug. 17, 2010, both of which are herein incorporated by reference in their entireties.

BACKGROUND OF THE INVENTION

Field of the Invention

The present invention relates to an information displaying apparatus and method thereof.

Description of Related Art

In general, an information displaying apparatus according to the related art displays information such as video information, audio information, or map data on the display unit.

BRIEF SUMMARY OF THE INVENTION

An information displaying apparatus according to an exemplary embodiment of the present invention may include a controller configured to detect a location of a specific point within an image captured by a capture unit and to match event information corresponding to an event generated location on map data to the captured image based on the location of the specific point and a current location; and a display unit configured to display the matched result.

As an example associated with the present invention, the event information may be road guide information.

As an example associated with the present invention, the event information may be point of interest (POI) information.

An information displaying apparatus according to an exemplary embodiment of the present invention may include a controller configured to detect an event generated location on map data based on a current location, to detect a location of a specific point within the captured image based on a depth map of an image captured by a capture unit and the current location, and to match event information corresponding to the detected event generated location to the captured image based on the current location and the location of the specific point; and a display unit configured to display the matched result.

As an example associated with the present invention, the event information may be road guide information and POI information.

As an example associated with the present invention, the depth map may be a depth map of a stereo image captured by the capture unit.

As an example associated with the present invention, the controller may generate an interactive viewpoint image based on the stereo image, and match the interactive viewpoint image to the event information.

As an example associated with the present invention, the capture unit may include a first camera and a second camera, and the controller may combine a first image captured by the first camera with a second image captured by the second camera to generate the interactive viewpoint image.

As an example associated with the present invention, the capture unit may include a first camera, a second camera, and a third camera located between the first camera and the second camera, and the controller may match an image captured by the third camera to the event information.

As an example associated with the present invention, the controller may display the road guide information on a road within the captured image.

As an example associated with the present invention, the controller may display the event information and the captured image on the display unit based on a current speed and a predetermined reference speed.

As an example associated with the present invention, the apparatus may further include a map matching unit configured to match the current location to a map link within the map data when a current speed is above a predetermined reference speed, and to display the matched map link on the display unit.

As an example associated with the present invention, the map matching unit may display the event information and the captured image on the display unit when the current speed is less than the predetermined reference speed.

As an example associated with the present invention, the controller may display the event information and the captured image on the display unit based on a reception intensity of the event information received through a communication network and a predetermined reference value.

As an example associated with the present invention, the apparatus may further include a map matching unit configured to match the current location to a map link within the map data when the reception intensity of the event information received a communication network is no greater than a predetermined reference value, and to display the matched map link on the display unit.

As an example associated with the present invention, the controller may display the event information and the captured image on the display unit when the reception intensity of the event information is less than the predetermined reference value.

An information displaying method according to an exemplary embodiment of the present invention may include detecting a location of a specific point within an image captured by a capture unit; matching event information corresponding to an event generated location on map data to the captured image based on the location of the specific point and a current location; and displaying the matched result on a display unit.

An information displaying method according to an exemplary embodiment of the present invention may include detecting an event generated location on map data based on a current location; detecting a location of a specific point within the captured image based on a depth map of an image captured by a capture unit and the current location; matching event information corresponding to the detected event generated location to the captured image based on the current location and the location of the specific point; and displaying the matched result on a display unit.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 12 is a flow chart illustrating an information (e.g., event information) displaying method according to a fourth exemplary embodiment of the present invention; and FIG. 13 is a flow chart illustrating an information (e.g., event information) displaying method according to a fifth exemplary embodiment of the present invention.

DETAILED DESCRIPTION OF THE INVENTION

Hereinafter, exemplary embodiments of an information displaying apparatus and method thereof capable of accurately displaying event information on a captured (e.g., photographed) actual image will be described with reference to FIGS. 1 through 13.

Figure 1:
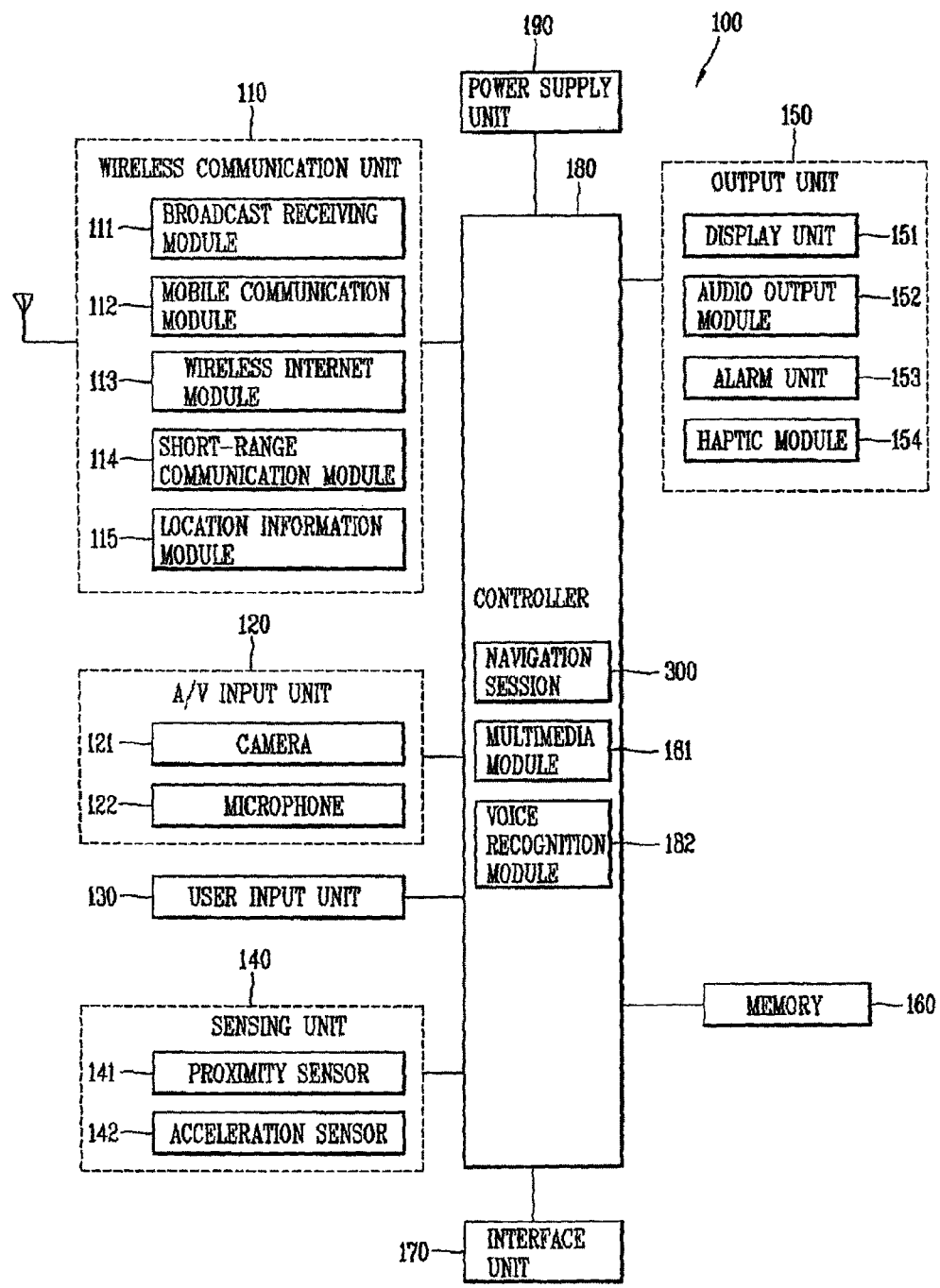
FIG. 1 is a schematic block diagram illustrating a configuration of a mobile communication terminal to which an information displaying apparatus according to exemplary embodiments of the present invention is applied.

FIG. 1 is a block diagram illustrating the configuration of a mobile communication terminal 100 to which an information displaying apparatus according to exemplary embodiments of the present invention is applied. The mobile communication terminal (e.g., mobile phone) 100 may be implemented in various forms. For example, there are mobile communication terminals 100 such as portable phone, smart phone, notebook computer, digital broadcast receiver, personal digital assistant (PDA), portable multimedia player (PMP), and the like.

As illustrated in FIG. 1, the mobile communication terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with greater or less elements than the elements as illustrated in FIG. 1.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), DVB-H, integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile communication terminal 100. Here, it may be used a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal. A GPS module is an example of a location information module. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable.

The A/V input unit 120 receives an audio or video signal, and the A/V input unit 120 may include a camera 121 and a microphone 122. The camera 121 processes an image frame, such as still picture or video, obtained by an image sensor in a video phone call or image capturing (e.g., photographing) mode. The processed image frame may be displayed on a display unit 151.

The image frames processed by the camera 121 may be stored in the memory 160, or other storage medium, or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170.

The output unit 150 is configured to provide an output for audio signal, video signal, or alarm signal, and the output unit 150 may include the display unit 151, an audio output module 152, an alarm unit 153, and the like.

The display unit 151 may display or output information processed in the mobile communication terminal 100. For example, when the mobile communication terminal 100 is in a phone call mode, the display unit 151 may display a UI or a GUI associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. The present invention is not limited to a single display as two or more display units may be provided. For example, an external display unit (not shown) and an internal display unit (not shown) are simultaneously provided in the mobile communication terminal 100.

Meanwhile, when the display unit 151 and a sensor for detecting a touch operation (hereinafter, 'touch sensor') are formed with an interlayer structure (hereinafter, 'touch screen'), the display unit 151 may be also used as an input device in addition to an output device. The touch sensor may be configured in a form of, for example, touch film, touch sheet, touch pad, or the like.

Furthermore, the touch sensor may be configured to convert a change such as pressure applied to a specific area of the display unit 151 or capacitance generated on a specific area of the display unit 151 into an electrical input signal. The touch sensor may be configured to detect a touch input pressure as well as a touch input position and a touch input area. When there is a touch input to the touch sensor, a signal (or signals) corresponding to the touch input is sent to a touch controller (not shown). The touch controller processes the signal (or signals) and then sends the corresponding data to a controller 180. From this, the controller 180 may know which region of the display unit 151 has been touched.

The proximity-touch refers to a state that a pointer approaches to a screen while being apart a predetermined distance from the screen without actually touching the screen.

The proximity sensor 141 may be arranged in an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this case, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen is a position where the pointer is positioned to correspond vertically to the touch screen when the pointer is proximately touched.

Furthermore, the proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can be outputted to the touch screen.

The sensing unit 140 may include an acceleration sensor 142. The acceleration sensor 142 is a device for transforming an acceleration change in any one direction into an electrical signal, which is widely used with the development of micro-electromechanical systems (MEMS) technology. There are various kinds of acceleration sensors 142 from those built in an airbag system of a vehicle to measure a large value of acceleration used to detect collision, to those that measure a small value of acceleration used as an input means to recognize the detailed operation of a human hand. The acceleration sensor 142 is typically configured by providing two or three axes in a package, and according to the used circumstances there may be a case where only one z-axis is required. Accordingly, when the x-axis or y-axis acceleration sensor is used instead of the z-axis acceleration sensor due to any reason, the acceleration sensor may be provided to be placed upright on a main substrate using a separate piece of substrate.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal associated with the function performed by the mobile terminal 100 (for example, a call signal reception sound, a message reception sound, etc.). The audio output module 152 may include a receiver, a speaker, a buzzer, and the like.

The alarm unit 153 may output a signal to notify the occurrence of an event of the mobile terminal 100. Examples of the event occurred in the mobile terminal 100 may include call signal reception, message reception, a key signal input, a touch input, and the like. In addition to an audio or video output, the alarm unit 153 may output a signal in a different manner to notify the occurrence of an event. For example, the alarm unit 153 may output in a form of vibration. When a call signal or message is received, the alarm unit 153 may vibrate the mobile terminal 100 through vibration means. When a key signal is inputted, the alarm unit 153 may vibrate the mobile terminal 100 through vibration means using a feedback to the key signal input. The user can recognize an occurrence of the through vibration as described above. The signal for notifying an occurrence of the event may be outputted through the display unit 151 or the audio output module 152.

The haptic module 154 generates various tactile effects felt by the user. A typical example of the tactile effects generated by the haptic module 154 is vibration where intensity, pattern, or the like, generated by the haptic module 154 can be controlled. For example, different vibrations may be combined and outputted or sequentially outputted.

The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may be implemented to provide a tactile effect through muscular senses by a finger or arm of the user as well as to transfer a tactile effect through direct contact. The present invention is not limited to a single haptic module as two or more haptic modules may be provided. The haptic module 154 may be provided at a place frequently being contacted by the user in a vehicle. For example, it may be provided on a steering wheel, a gearshift lever, a seat, or the like.

The memory 160 may store software programs for processing and controlling the controller 180, or may temporarily store data (for example, phonebook, message, still image, video, and the like) that are inputted and/or outputted. The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile communication terminal 100 may run a web storage that performs the storage function of the memory 160 over the Internet, or operate in association with the web storage.

Furthermore, the memory 160 stores image information received from an external terminal, image information inputted through the camera 121, or the like. Here, the image information may include still images and/or moving images.

Furthermore, the memory 160 stores a plurality of compression methods. The plurality of compression methods may include standard compression methods proposed by ISO (International Standardization Organization)/IEC (International Electro-technical Commission), ITU-T (ITU Telecommunication Standardization Sector), CCITT (Consultative Committee International Telegraph and Telephone), and the like (for example, JPEG (Joint Photography Experts Group), JPEG 2000, JBIG (Joint Bi-level Image Experts Group), JBIG2, dejavu (DjVu), fractal compression, ICER, PGF (progressive graphics file), wavelet compression, S3TC (S3 texture compression), lossless JPEG, PNG (portable network graphics), BMP (BitMap), WBMP, PCX (PC Paintbrush Exchange), TGA (Truevision TGA), TIFF (Tagged Image File Format), GIF (Graphics Interchange Format), ASF (Active Streaming Format), AVI (Audio Video Interleaving), MJPEG, motion JPEG, MPEG (Moving Picture Experts Group)-1, MPEG-2, MPEG-4, H.261, H.262, H.263, H.264, Ogg Theora, Dirac, etc.).

The interface unit 170 serves as an interface to every external device that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, an earphone port, and the like. Here, the identification module, as a chip that stores various information for authenticating the authority to use the mobile terminal 100, may include a UIM, SIM, a USIM, or the like. In addition, the device having the identification module (hereinafter, 'identifying device') may be made in a form of smart card. Accordingly, the identifying device may be connected with the mobile terminal 100 through a port. The interface unit 170 is provided to receive data or power from an external device and transfer the received data or power to every element within the mobile terminal 100 or may be used to transfer data within the mobile terminal to an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal 100 therethrough. Various command signals or the power inputted from the cradle may operate as a signal for recognizing when the mobile terminal is properly mounted on the cradle.

The controller 180 typically controls a general operation of the mobile terminal 100. For example, the controller 180 performs a control and processing operation associated with a voice call, a data communication, a video phone call, and the like. In addition, the controller 180 may include a multimedia module 181 for reproducing multimedia content. The multimedia module 181 may be provided within the controller 180 or may be separately provided from the controller 180.

The controller 180 may perform a pattern recognition processing to recognize a handwriting or picture-drawing input performed on the touch screen as a character or image, respectively.

The power supply unit 190 receives external or internal power to supply the power required for an operation of each element under a control of the controller 180.

The function of an element applied to the mobile terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such exemplary embodiments may be implemented in the controller 180. For software implementation, the exemplary embodiments such as procedures or functions may be implemented together with separate software modules that allow performing of at least one function or operation. Software codes can be implemented by a software application written in any suitable programming language. Also, the software codes may be stored in the memory 160 and executed by the controller 180.

The voice recognition module 182 recognizes a voice uttered by a user, and performs a relevant function based on the recognized voice signal.

A navigation session 300 applied to the mobile communication terminal 100 displays a travel path on data map.

An information displaying apparatus applied to a mobile communication terminal 100 according to exemplary embodiments of the present invention may include a controller 180 configured to detect a location of a specific point within a captured actual image and match event information (for example, road guide information and/or POI information) corresponding to an event generated location on map data to the captured image based on the location of the specific point and a current location; and a display unit 151 configured to display the matched result. For example, the controller 180 detects an event generated location (e.g., coordinates) on map data based on a current location, and detects the location (e.g., coordinates) of a specific point within the captured image based on a depth map of the captured actual image and the current location, and matches event information (for example, road guide information and/or POI information) corresponding to the detected event generated location to the captured image based on the current location and the location of the specific point. The display unit 151 displays the matched result on a screen.

The event generated position indicates a position (e.g., location) generating road guide information such as left turn, right turn, go straight, P-turn, and U-turn information on map data stored in the memory 160. The event generated position may indicate a position (e.g., location) where POI information is generated. The road guide information may be displayed to be matched to a road within the captured image, and may be displayed on any location within the captured image.

The controller 180 detects the distance and direction to a target image corresponding to the specific point within the captured actual image, thereby detecting the location of a target image corresponding to the specific point. The specific point may be randomly set.

Hereinafter, the configuration of a telematics terminal 200 to which an information displaying apparatus according to exemplary embodiments of the present invention is applied will be described with reference to FIG. 2.

Figure 2:
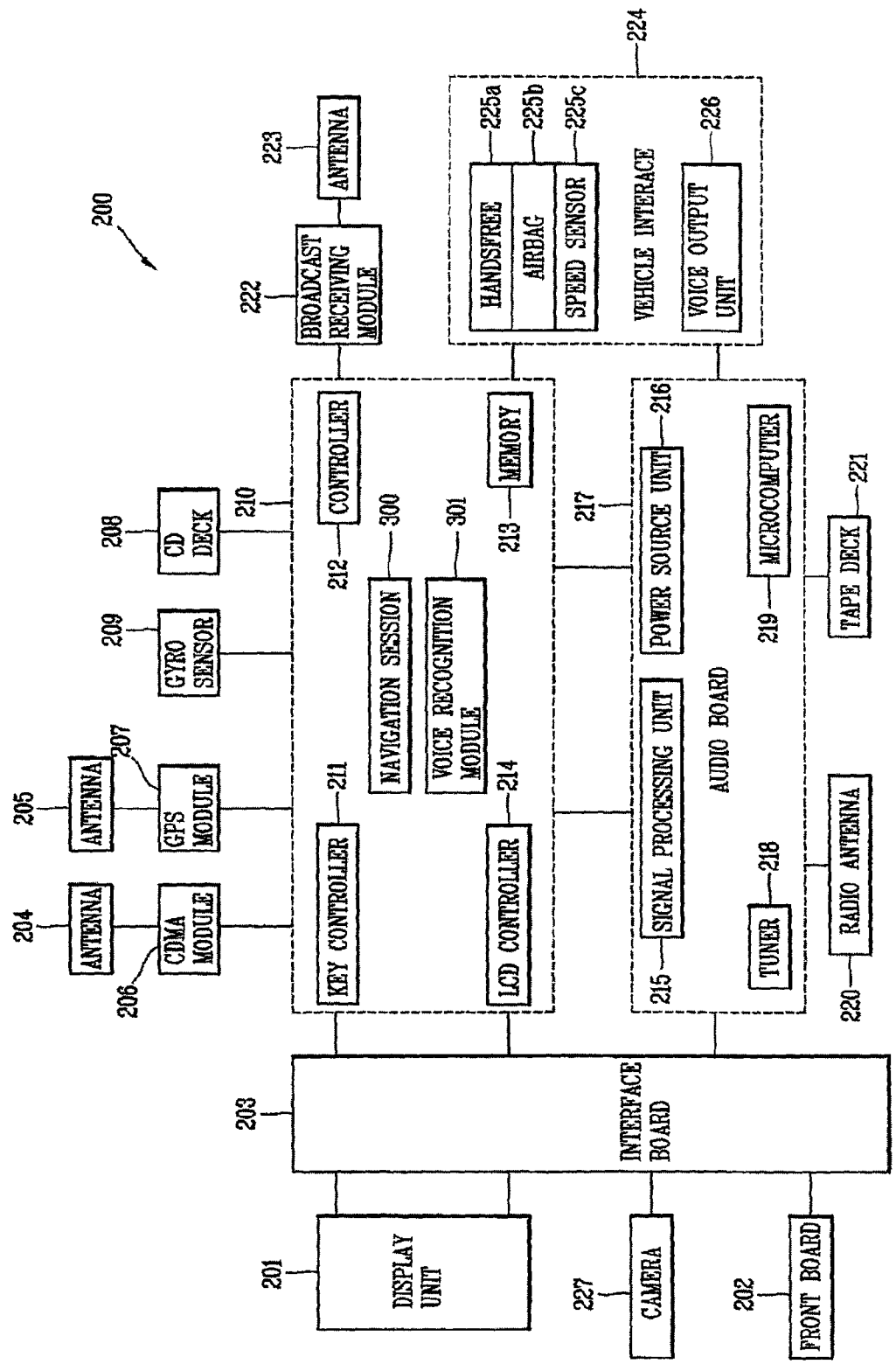
FIG. 2 is a schematic block diagram illustrating a configuration of a telematics terminal to which an information control apparatus according to exemplary embodiments of the present invention is applied.

As illustrated in FIG. 2, the telematics terminal 200 may include a central processing unit (CPU) 212 for performing an overall control of the telematics terminal 200, a memory 213 for storing a variety of information, a key controller 211 for controlling a variety of key signals, and a main board 210 having an LCD controller 214 for controlling an liquid crystal display device (LCD) therein.

The memory 213 stores map information (e.g., map data) for displaying road guide information on a digital map. In addition, the memory 213 stores information for an algorithm of controlling traffic information collection to allow an input of traffic information depending on a road condition in which a vehicle is currently traveling, and for controlling the algorithm.

The main board 210 may include a code division multiple access (CDMA) module 206 serving as a mobile communication terminal built in a vehicle which is given with a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. The main board 210 is connected via an interface board 203 to a display unit (e.g., LCD) 201 controlled by the LCD controller 214, a front board 202 controlled by a key controller 211, and a camera 227 for capturing an inside and/or outside of the vehicle. The display unit 201 displays a variety of video signals and text signals, and the front board 202 is provided with buttons for allowing an input of a variety of key signals so as to provide a key signal corresponding to a button selected by the user to the main board 210. In addition, the display unit includes a proximity sensor and a touch sensor (touch screen) of FIG. 2.

The front board 202 is provided with a menu key for allowing a direct input of traffic information, and the menu key may be configured to be controlled by the key controller 211.

The audio board 217 is connected to the main board 210 and processes a variety of audio signals. The audio board 217 may include a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 is configured to have a radio antenna 220 for receiving a radio signal and a tape deck 221 for reproducing an audio tape. The audio board 217 may further include an audio output unit (amplifier) 226 for outputting a voice signal processed by the audio board 217.

The audio output unit (e.g., amplifier) 226 is connected to a vehicle interface 224. In other words, the audio board 217 and the main board 210 are connected to the vehicle interface 224. A hands-free unit 225a for inputting a voice signal, an airbag 225b for passenger safety, a speed sensor 225c for detecting a vehicle speed and the like may be connected to the vehicle interface 224. The speed sensor 225c calculates a vehicle speed, and provides the calculated vehicle speed information to the central processing unit 212. Meanwhile, the mobile vehicle navigation apparatus 300 applied to the telematics terminal 200 generates road guide information based on map data and current vehicle location information, and notifies the generated road guide information to the user.

The display unit 201 senses a proximity touch within the display window through a proximity sensor. For example, when a pointer (for example, finger or stylus pen) is proximity-touched, the display unit 201 detects the position of the proximity touch, and outputs position information corresponding to the detected position to the controller 212.

The voice recognition device (or voice recognition module) 301 recognizes a voice uttered by a user, and performs a relevant function based on the recognized voice signal.

A navigation session 300 applied to the telematics terminal 200 displays a current location and a travel path on data map.

An information displaying apparatus applied to a telematics terminal 200 according to exemplary embodiments of the present invention may include a controller 212 configured to detect a location of a specific point within a captured actual image and match event information (for example, road guide information and/or POI information) corresponding to an event generated location on map data to the captured image based on the location of the specific point and a current location; and a display unit 201 configured to display the matched result. For example, the controller 212 detects an event generated location (e.g., coordinates) on map data based on a current location, and detects the location (e.g., coordinates) of a specific point within the captured image based on a depth map of the captured actual image and the current location, and matches event information (for example, road guide information and/or POI information) corresponding to the detected event generated location to the captured image based on the current location and the location of the specific point. The display unit 201 displays the matched result on a screen.

The event generated position indicates a position (e.g., location) generating road guide information such as left turn, right turn, go straight, P-turn, and U-turn information on map data stored in the memory 213. The event generated position may indicate a position (e.g., location) where POI information is generated. The road guide information may be displayed to be matched to a road within the captured image, and may be displayed on any location within the captured image.

The controller 212 detects the distance and direction to a target image corresponding to the specific point within the captured actual image, thereby detecting the location of a target image corresponding to the specific point. The specific point may be randomly set.

Figure 3:
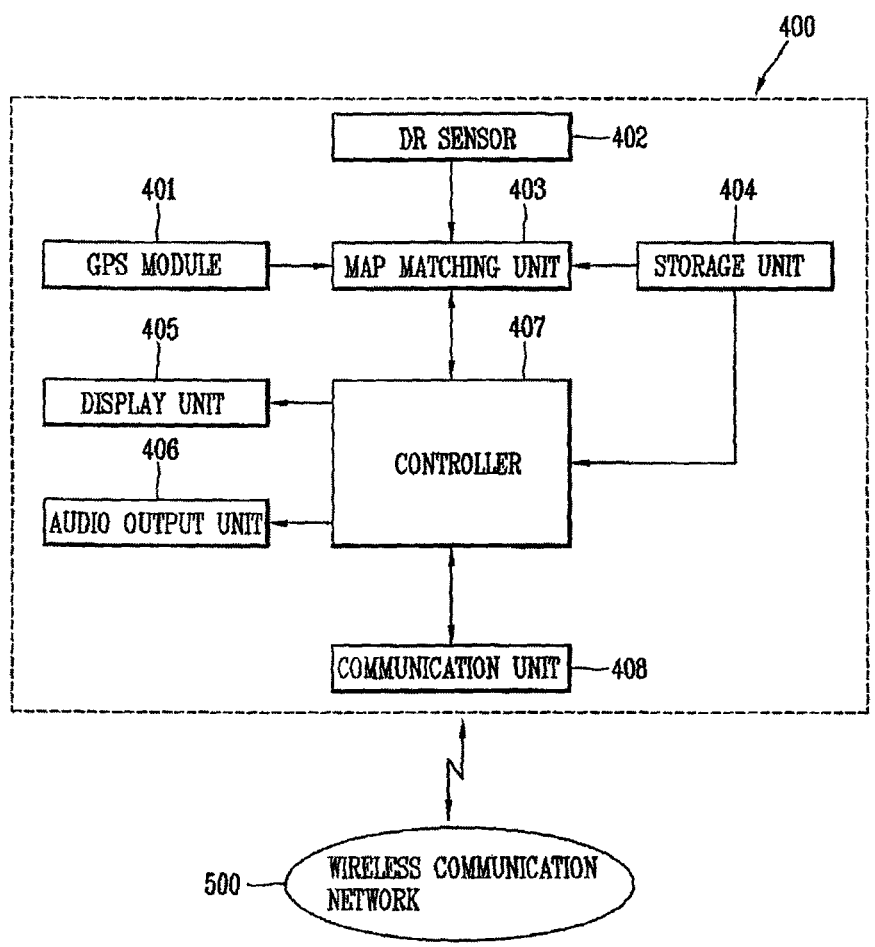
FIG. 3 is a schematic block diagram illustrating a configuration of a navigation (e.g., vehicle navigation) apparatus to which a vehicle control apparatus according to exemplary embodiments of the present invention is applied.

FIG. 3 is a block diagram illustrating the configuration of a navigation (e.g., vehicle navigation) apparatus 400 to which an vehicle control apparatus according to exemplary embodiments of the present invention is applied.

The navigation (e.g., vehicle navigation) apparatus 400 can be classified into in-dash type and on-dash type depending on how the navigation vehicle 400 is installed in the vehicle 200. An in-dash type navigation (e.g., vehicle navigation) apparatus is one that is firmly installed by being inserted in a predetermined space assigned in a dashboard of the vehicle 200. An on-dash type navigation (e.g., vehicle navigation) apparatus is either attached on a dash board of the vehicle 200 or installed by using a dedicated mount near the dash board. Since the on-dash type navigation (e.g., vehicle navigation) can be detached or attached, it can be separated from the vehicle 200 to be carried by the user.

The navigation (e.g., vehicle navigation) apparatus 400 according to an exemplary embodiment of the present invention includes both the aforementioned in-dash and on-dash type navigation (e.g., vehicle navigation) apparatuses. In addition, the navigation (e.g., vehicle navigation) apparatus 400 further includes all kinds of information processing devices, such as various portable terminals, capable of receiving and/or processing of traffic information to carry out a navigation function in association with a GPS receiver receiving navigation messages transmitted from GPS satellites in the vehicle 200.

As illustrated in FIG. 3, the navigation apparatus may include a GPS module 401 for receiving a GPS signal received from a satellite and generating first vehicle position data of a mobile vehicle navigation apparatus (assumed to be in the same location as the telematics terminal 200 or mobile communication terminal 100) based on the received GPS signal; a dead-reckoning (DR) sensor 402 for generating second vehicle position data based on a traveling direction of a vehicle and the vehicle speed; a storage unit (or memory) 404 for storing map data and various information; a map matching unit 403 for generating an estimated vehicle position based on the first vehicle position data and the second vehicle position data, and matching the generated vehicle position to a link (e.g., map matching link or map matching road) in the map data stored in the storage unit 404, and outputting the matched map information (e.g., map matching result); a communication unit 408 for receiving real-time traffic information from an information providing center and/or neighboring vehicles through a wireless communication network 500 and carrying out a phone communication; a controller 407 for generating road guide information based on the matched map information (e.g., map matching result); a display unit 405 for displaying a road guide map (including POI information) included in the road guide information and the traffic information; and an audio output unit 406 for outputting an audio signal corresponding to road guide voice information (e.g., road guide voice message) included in the road guide information or the traffic information.

The communication unit 408 may receive call signals and/or text messages received through the base station, may include a hands-free implementation having a Bluetooth module, and may receive a broadcast signal including traffic information in a TPEG format from the broadcasting station through an antenna. The broadcast signal includes video and audio data according to various specifications, such as terrestrial or satellite DMB, DAB, DVB-T, DVB-H, and the like. In addition, the broadcast signal includes traffic information according to traffic information (TPEG) services and binary format for scene (BIFS) data services, and supplementary information such as various supplementary data. Moreover, the communication unit 408 synchronizes a signal bandwidth provided with traffic information, demodulates the synchronized signal, and outputs the decoded signal to the TPEG decoder (included in a controller 407).

The TPEG decoder decodes traffic information in a TPEG format and provides a variety of information including traffic lights information included in the traffic information to the controller 407.

Furthermore, the road guide information may include various information associated with travel, such as traffic lane information, travel speed limit information, turn-by-turn information, traffic safety information, traffic guide information, vehicle information, road search information, and the like, as well as map data.

The signal received through the GPS module 401 may be configured to provide the location information of a terminal to the navigation apparatus 400 using wireless communication methods proposed by the Institute of Electrical and Electronics Engineers (IEEE), such as the IEEE 802.11 Wireless Network Standard for a wireless LAN including wireless LANs, some of infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

An input unit may be further provided in the navigation apparatus 400 to allow user to select various functions or input information. As described above, the input unit may include various devices such as a keypad, a touch screen, a jog shuttle, a microphone, and the like.

The map matching unit 403 generates an estimated location of the vehicle on the basis of the first location data and the second location data, and reads map data corresponding to a travel path from the storage unit 404.

The map matching unit 403 matches the estimated location of the vehicle with a link (e.g., road) included in the map data, outputs the matched map information (e.g., map-matched result) to the controller 407. For example, the map matching unit 403 generates an estimated location of the vehicle on the basis of the first location data and the second location data, matches the generated estimated location of the vehicle with links within the map data stored in the storage unit 404 based upon the link sequence thereof, and outputs the matched map information (e.g., map-matched result) to the controller 407. The map matching unit 403 may output road attribute information such as single-level or double-level roads included in the matched map information (e.g., map-matched result) to the controller 407. Furthermore, the function of the map matching unit 403 may be implemented by the controller 407.

The storage unit 404 stores map data. At this time, the stored map data may include a geographic coordinate (or longitude and latitude coordinate) for displaying the longitude and latitude in the Degree/Minute/Second (DMS) unit. Here, the stored map data may use the Universal Transverse Mercator (UTM) coordinate, the Universal Polar System (UPS) coordinate, the Transverse Mercator (TM) coordinate, and the like, in addition to the geographic coordinate.

In addition to storing map data, the storage unit 404 stores various information, such as various menu screens, POIs, function characteristic information based upon specific locations of the map data, and the like. The storage unit 404 may also store various UIs and/or GUIs. The storage unit 404 stores data, programs, and the like, which are required for operating the navigation device 400. The storage unit 404 may also store destination information inputted from the user through the input unit. Here, the destination information may be a destination, or either one of a departure and a destination.

The display unit 405 displays image information (or road guide map) included in the road guide information generated by the controller 407. Here, the display unit 405 may include a touch sensor (e.g., touch screen) or proximity sensor. Furthermore, the road guide information may include various information associated with driving a vehicle, such as traffic lane information, driving speed limit information, turn-by-turn information, traffic safety information, traffic guide information, vehicle information, road search information, and the like, in addition to map data.

Furthermore, when displaying the image information, the display unit 405 may display various contents, such as various menu screens, road guide information, and the like, using UIs and/or GUIs included in the storage unit 404. Here, the contents displayed on the display unit 405 include various text or image data (including map data or various information data), and menu screens including icons, list menus, combo boxes, and the like.

The audio output unit 406 outputs voice information (or voice messages for road guide information) included in the road guide information generated by the controller 407. Here, the audio output unit 406 may be an amplifier or speaker.

The controller 407 generates road guide information on the basis of the matched map information, and outputs the generated road guide information to the display unit 405 and audio output unit 406. Here, the display unit 405 displays the road guide information.

The controller 407 receives real-time traffic information from the information providing center and/or a terminal mounted on a neighboring vehicle (e.g., vehicle navigation device) to generate road guide information.

Furthermore, the controller 407 is connected with a call center through a communication unit 408 to perform a phone call, transmit or receive information between the navigation device 400 and the call center. Here, the communication unit 408 may further include a hands-free module having a Bluetooth function using a short-range wireless communication method.

A vehicle displaying apparatus applied to a navigation (e.g., vehicle navigation) apparatus 400 according to exemplary embodiments of the present invention may include a controller 407 configured to detect a location of a specific point within a captured actual image and match event information (for example, road guide information and/or POI information) corresponding to an event generated location on map data to the captured image based on the location of the specific point and a current location; and a display unit 405 configured to display the matched result. For example, the controller 407 detects an event generated location (e.g., coordinates) on map data based on a current location, and detects the location (e.g., coordinates) of a specific point within the captured image based on a depth map of the captured actual image and the current location, and matches event information (for example, road guide information and/or POI information) corresponding to the detected event generated location to the captured image based on the current location and the location of the specific point. The display unit 405 displays the matched result on a screen.

The event generated position indicates a position (e.g., location) generating road guide information such as left turn, right turn, go straight, P-turn, and U-turn information on map data stored in the storage unit 404. The event generated position may indicate a position (e.g., location) where POI information is generated. The road guide information may be displayed to be matched to a road within the captured image, and may be displayed on any location within the captured image.

The controller 407 detects the distance and direction to a target image corresponding to the specific point within the captured actual image, thereby detecting the location of a target image corresponding to the specific point. The specific point may be randomly set.

An information displaying apparatus and method thereof according to a first exemplary embodiment of the present invention will be described with reference to FIGS. 4 through 8. The information displaying apparatus and method thereof according to a first exemplary embodiment of the present invention may be applicable to various terminals such as a smart phone, a notebook computer, a PDA, a PMP, a portable terminal, a mobile terminal, a Wibro terminal, an IPTV (Internet Protocol Television) terminal, a television, a navigation terminal, an AVN (Audio Video Navigation) as well as a mobile terminal such as a mobile communication terminal 100, the telematics terminal 200, and a navigation apparatus 400.

Figure 4:
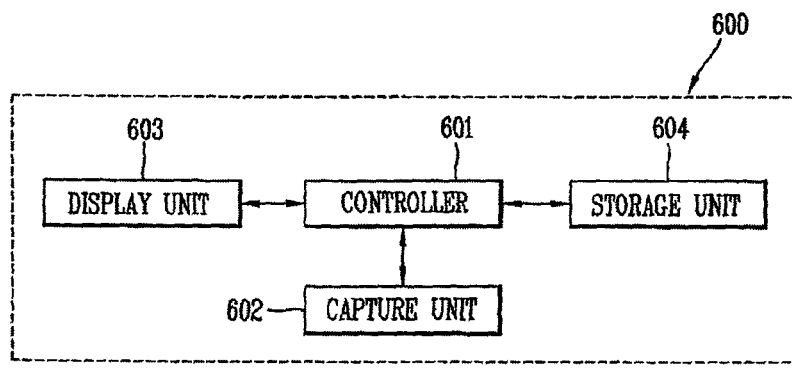
FIG. 4 is a schematic block diagram illustrating an information (e.g., road guide information) displaying apparatus according to a first exemplary embodiment of the present invention.

FIG. 4 is a block diagram illustrating an information (e.g., road guide information) displaying apparatus according to a first exemplary embodiment of the present invention.

As illustrated in FIG. 4, an information (e.g., road guide information) displaying apparatus applied to a telematics terminal 600 according to a first exemplary embodiment of the present invention may include a controller 601, a capture unit 602, a display unit 603, and a storage unit 604. The controller 601 is configured to detect a location of a specific point within an image captured (e.g., photographed) by the capture unit (e.g., photograph unit) 602 and match event information (for example, road guide information and/or POI information) corresponding to an event generated location on map data to the captured (e.g., photographed) image based on the location of the specific point and a current location. The display unit 603 is configured to display the matched result. For example, the controller 601 detects an event generated location (e.g., coordinates) on map data based on a current location, and detects the location (e.g., coordinates) of a specific point within the captured image based on a depth map of the image captured by the capture unit 602 and the current location, and matches event information (for example, road guide information and/or POI information) corresponding to the detected event generated location to the captured image based on the current location and the location of the specific point. The display unit 603 displays the matched result on a screen.

The event generated position indicates a position (e.g., location) generating road guide information such as left turn, right turn, go straight, P-turn, and U-turn information on map data stored in the storage unit 604. The event generated position may indicate a position (e.g., location) where POI information is generated. The road guide information may be displayed to be matched to a road within the captured image, and may be displayed on any location within the captured image.

The controller 601 detects the distance and direction to a target image corresponding to the specific point within the image captured by the capture unit 602, thereby detecting the location of a target image corresponding to the specific point. The specific point may be randomly set.

The capture unit 602 may be configured with a first and a second camera horizontally arranged to capture a front-side image, or configured with a first, a second camera, and a third camera provided between the first and the second camera. The first and the second camera may be used to detect any specific point and the distance and direction to a current location (e.g., camera location) within a captured image, and the third camera may be used to display a front-side image on the display unit 603.

The storage unit 604 may store two-dimensional (2D) map data and/or three-dimensional (3D) map data, a program, a document, and the like. The storage unit 604 may include at least one type of storage medium including a flash memory type, a hard disk type, a multimedia card micro type, a card-type memory (e.g., SD or DX memory, etc), RAM, SRAM, ROM, EEPROM, PROM magnetic memory, a magnetic disk, an optical disk, and the like. Furthermore, the storage unit 604 may store image information received from an external terminal, image information inputted through the capture unit 602, and the like. Here, the image information may include still images and/or moving images.

The controller 601 displays road guide information corresponding to an event generated position at the event generated position (event generated location) matched to the captured image.

An image matched together with the event generated position may be an interactive viewpoint image in which images captured by the first and the second camera are combined with each other, or may be an image captured by a third camera provided between the first and the second camera. For example, an image acquired by the first camera at a left viewpoint of the stereo image with respect to a front-side scene may be called a left image, and an image acquired by the second camera at a right viewpoint thereof may be called a right image. Also, an image acquired by the third camera at an interactive viewpoint between the left and the right viewpoint with respect to a front-side scene or combined from the stereo image may be called an interactive viewpoint image. Also, an image matched together with the event generated position may correspond to either one of the images captured by the first or the second camera.

The controller 601 generates a depth map based on a stereo image captured by the capture unit 602. The controller 601 designates one of the captured left and right images as a reference image and designates the other one as an object image, and then finds pixels (corresponding pixels) corresponding to any pixel (reference pixel) from the object image.

The controller 601 analyzes similarity between the reference pixel and a certain region adjacent to the corresponding pixels, and determines a corresponding pixel having the highest similarity as an object pixel. The controller 601 estimates a variation, which is a coordinate difference between the reference pixel and the corresponding pixel, calculates depth information based on the estimated variation, and accumulates the depth information to generate a depth map. For the variation estimation methods, there are a region-based method of dividing an image into a predetermined sized region and estimating a variation with a region unit, a feature-based method of finding the features of an image and matching between the features, and the like.

In the region-based method, a two-dimensional template window is used to calculate a cross-correlation between the reference image and the object image and estimate the variation. For the correlation functions, there are SAD (Sum of Absolute Difference), ZSAD (Zero mean Sum of Absolute Difference), SSD (Sum of Squared Difference), NCC (Normalized Cross Correlation), ZNCC (Zero mean Normalized Cross Correlation), or the like. The variation is estimated by using only the luminance value of a pixel in the region-based method, whereas the variation is estimated by using the feature of an image in the feature-based method. For the used features of the image, there are sign of zero crossing, gradient peak, region, line, boundary, and the like. The depth map is also described in U.S. Pat. Nos. 7,675,540 and 7,764,827, which are herein incorporated by reference, and thus further detailed description thereof will be omitted.

The controller 601 may generate an interactive viewpoint image by combining images (for example, stereo image) captured by the capture unit 602.

Figure 5:
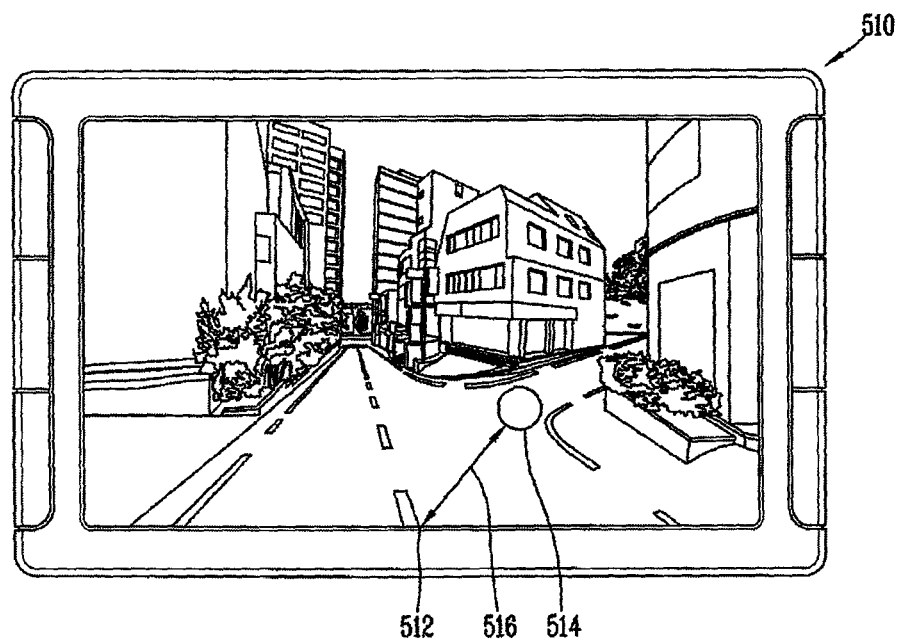
FIG. 5 is an exemplary view illustrating an image to a front-side scene.
Figure 6:
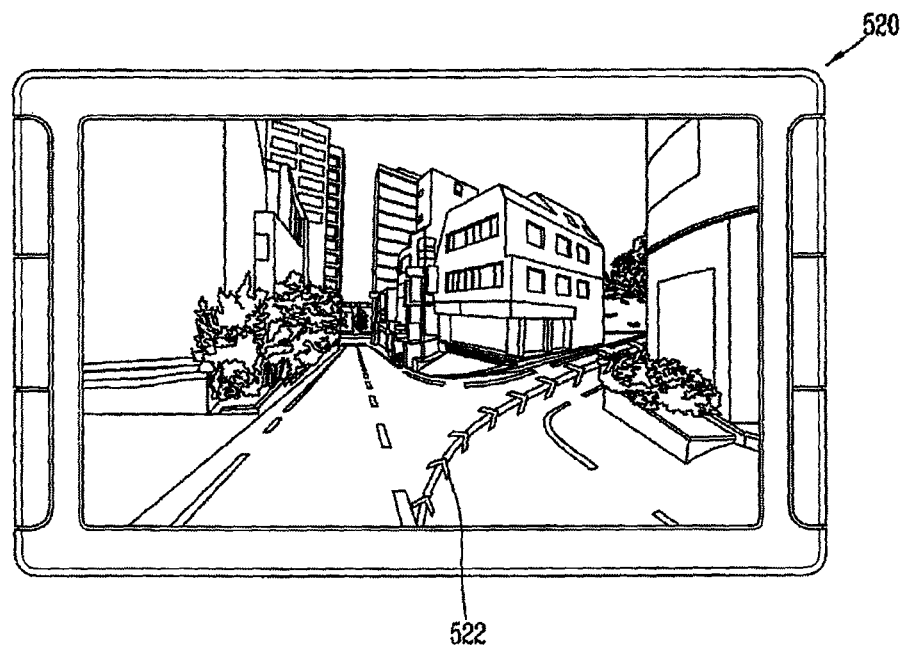
FIG. 6 is an exemplary view illustrating a result of matching a captured (e.g., photographed) image to road guide information.

FIG. 5 is an exemplary view illustrating an image to a front-side scene and FIG. 6 is an exemplary view illustrating a result of matching a captured image to road guide information.

As illustrated in FIG. 5, the controller 601 detects the distance and direction (location) of a specific point 514 within a captured image 510 based on a depth map of the image captured by the capture unit 602 and the current location 512.

As illustrated in FIGS. 5 and 6, the controller 601 matches road guide information 522 corresponding to the detected event generated location to the captured image 520 based on the current location 512 and the location of the specific point 514. The display unit 603 displays the matched result on a screen.

The controller 601 may read POI information stored in the storage unit 604, determine a location where the POI information is to be displayed on the captured image based on the current location (for example, estimated vehicle location) and depth map, and match the determined POI information to the captured image. At this time, the display unit 603 displays the matched result. The POI information may include various POIs such as restaurant information, rest area information, tourist attraction information, parking area information, service center information, gas station information, and the like.

Figure 7:
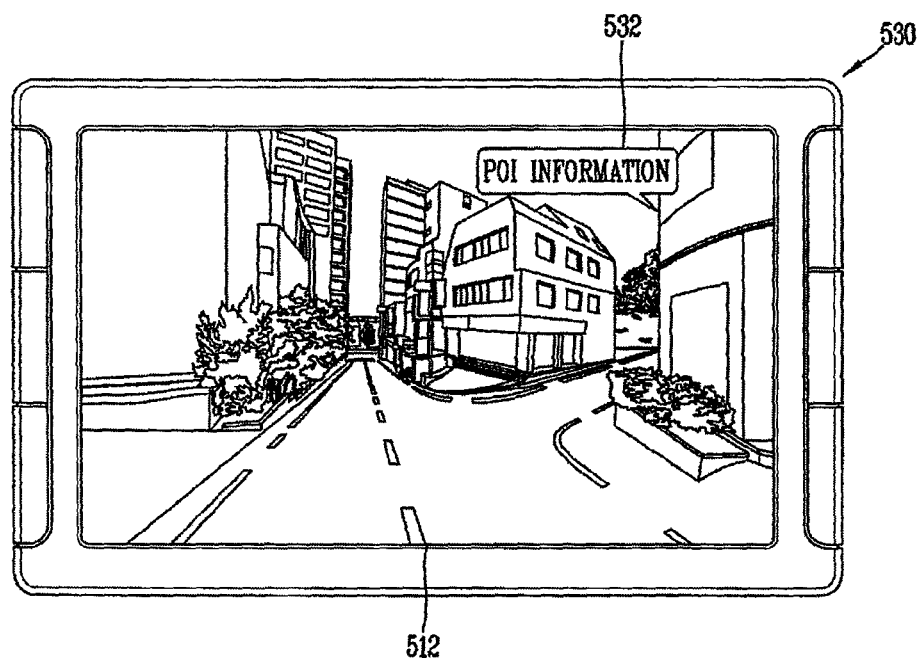
FIG. 7 is an exemplary view illustrating a result of matching a captured image to Point-of-Interest (POI) information.

FIG. 7 is an exemplary view illustrating a result of matching a captured image to POI information.

As illustrated in FIG. 7, the controller 601 may read POI information stored in the storage unit 604 or server, determine a location where the POI information is to be displayed on the captured image based on the current location 512 (for example, estimated vehicle location) and depth map, and match the determined POI information 532 to the captured image 530. At this time, the display unit 603 displays the matched result.

The controller 601 may receive update information to POI from the server managing the POI information 532 through a wireless communication network. The controller 601 updates the POI information stored in the storage unit 604 according to the POI update information received from the server. The controller 601 may periodically update POI information or update POI information according to the user's request. Also, the update of POI information may be implemented through a local area network such as Wi-Fi, or a wide area network such as Wibro, a mobile operator's data communication service, or the like.

An information (e.g., event information) displaying method according to a first exemplary embodiment of the present invention will be described with reference to FIGS. 4 and 8.

Figure 8:
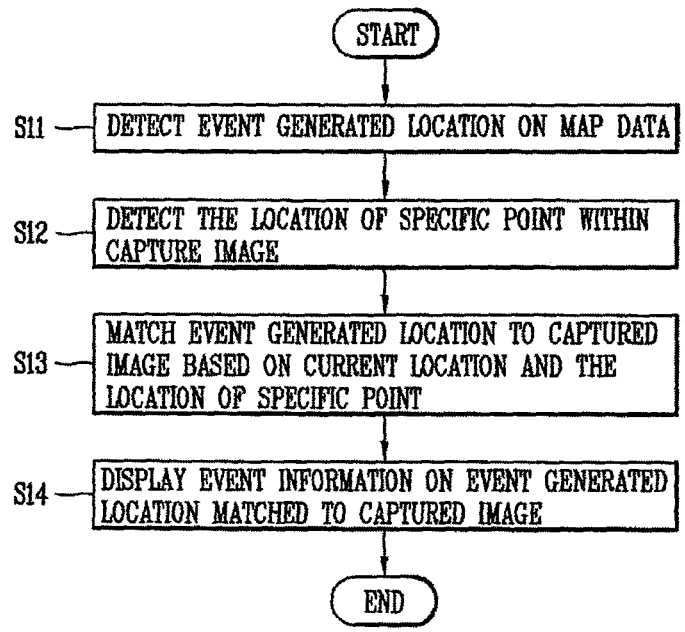
FIG. 8 is a flow chart illustrating an information (e.g., event information) displaying method according to a first exemplary embodiment of the present invention.

FIG. 8 is a flow chart illustrating an information (e.g., event information) displaying method according to the first exemplary embodiment of the present invention.

First, the controller 601 detects the location of an event generated position (e.g., event generated location) on the map data stored in the storage unit 604 based on a current location (for example, estimated vehicle location) (S11). For example, the controller 601 can detect the location of an event generated position by detecting the distance and direction from the estimated vehicle location (e.g., current location) to an event generated position on the map data stored in the storage unit 604 based on the estimated vehicle location.

The controller 601 generates a depth map of an image real-time captured through the capture unit 602, and detects (detects the location of a specific point) the distance and direction from the capture unit 602 (regarded same as the estimated vehicle location) to a specific point within the captured image based on the generated depth map (S12). For example, the location of a target image corresponding to the specific point may be detected by detecting the distance and direction to a target image corresponding to the specific point within an image captured by the capture unit 602. The specific point may be randomly set. The depth map is a depth map of a stereo image captured through the capture unit 602.

The controller 601 matches the detected event generated position (e.g., event generated location) to the captured image based on a current location (e.g., estimated vehicle location) and the location of the specific point (S13). For example, the controller 601 knows the estimated vehicle location and the location of a specific point within the captured image, and thus the event generated position can be matched to the captured image based on the estimated vehicle location and the location of a specific point. In other words, the controller 601 knows the estimated vehicle location and the location of a specific point within an image, and thus it is known at which location of the captured image an event generated position within map data should be placed.

An image matched to the event generated position (e.g., event generated location) may be an interactive viewpoint image in which images captured by the first and the second camera are combined with each other, or may be an image captured by a third camera provided between the first and the second camera. Also, the image matched to the event generated position may be either one of images captured by the two cameras.

The controller 601 displays event information corresponding to the event generated position on an event generated position (e.g., event generated location) matched to the captured image (S14).

As a result, an information displaying apparatus and method thereof according to a first exemplary embodiment of the present invention detects the location of a specific point within an image captured by a capture unit, matches event information corresponding to an event generated location on map data to the captured image based on the location of the specific point and a current location, and displays the matched result on the display unit, thereby accurately displaying the event information on a captured actual image.

Figure 9:
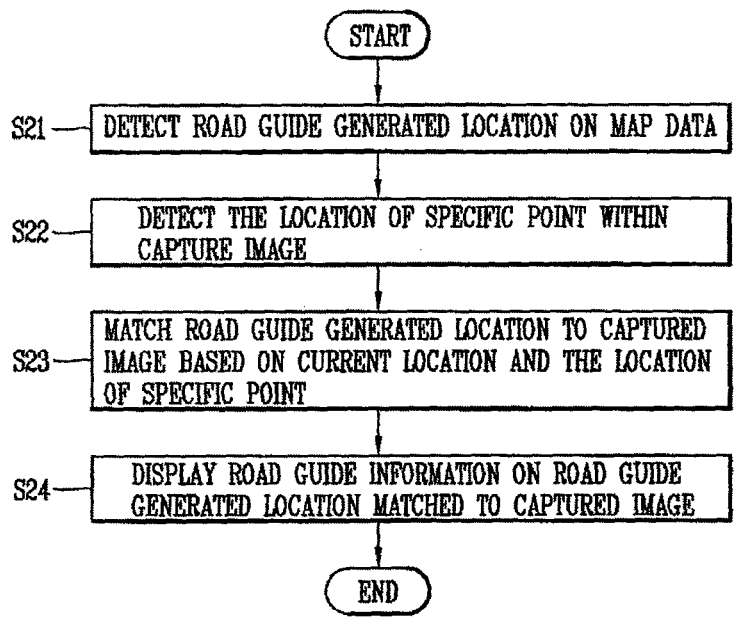
FIG. 9 is a flow chart illustrating an information (e.g., road guide information) displaying method according to a second exemplary embodiment of the present invention.

An information (e.g., road guide information) displaying method according to a second exemplary embodiment of the present invention will be described with reference to FIGS. 4 and 9.

FIG. 8 is a flow chart illustrating an information (e.g., road guide information) displaying method according to the second exemplary embodiment of the present invention.

First, the controller 601 detects the location of a road guide generated position (e.g., road guide generated location) on the map data stored in the storage unit 604 based on a current location (for example, estimated vehicle location) (S21). For example, the controller 601 can detect the location of a road guide generated position by detecting the distance and direction from the estimated vehicle location (e.g., current location) to an road guide generated position on the map data stored in the storage unit 604 based on the estimated vehicle location.

The controller 601 generates a depth map of an image real-time captured through the capture unit 602, and detects (detects the location of a specific point) the distance and direction from the estimated vehicle location to a specific point within the captured image based on the generated depth map (S22). For example, the location of a target image corresponding to the specific point may be detected by detecting the distance and direction to a target image corresponding to the specific point within an image captured by the capture unit 602. The specific point may be randomly set. The depth map is a depth map of a stereo image captured through the capture unit 602.

The controller 601 matches the detected road guide generated position (e.g., road guide generated location) to the captured image based on a current location (e.g., estimated vehicle location) and the location of the specific point (S23). For example, the controller 601 knows the estimated vehicle location and the location of a specific point within the captured image, and thus the road guide generated position can be matched to the captured image based on the estimated vehicle location and the location of a specific point. In other words, the controller 601 knows the estimated vehicle location and the location of a specific point within an image, and thus it is known at which location of the captured image a road guide generated position within map data should be placed.

An image matched to the road guide generated position (e.g., road guide generated location) may be an interactive viewpoint image in which images captured by the first and the second camera are combined with each other, or may be an image captured by a third camera provided between the first and the second camera. Also, the image matched to the road guide generated position may be either one of images captured by the two cameras.

The controller 601 displays road guide information corresponding to the road guide generated position on an road guide generated position (e.g., road guide generated location) matched to the captured image (S24).

As a result, an information displaying apparatus and method thereof according to a second exemplary embodiment of the present invention detects the location of a specific point within an image captured by a capture unit, matches road guide information corresponding to a road guide generated location on map data to the captured image based on the location of the specific point and a current location, and displays the matched result on the display unit, thereby accurately displaying the road guide information on a captured actual image.

An information (e.g., POI information) displaying method according to according to a third exemplary embodiment of the present invention will be described with reference to FIGS. 4 and 10.

Figure 10:
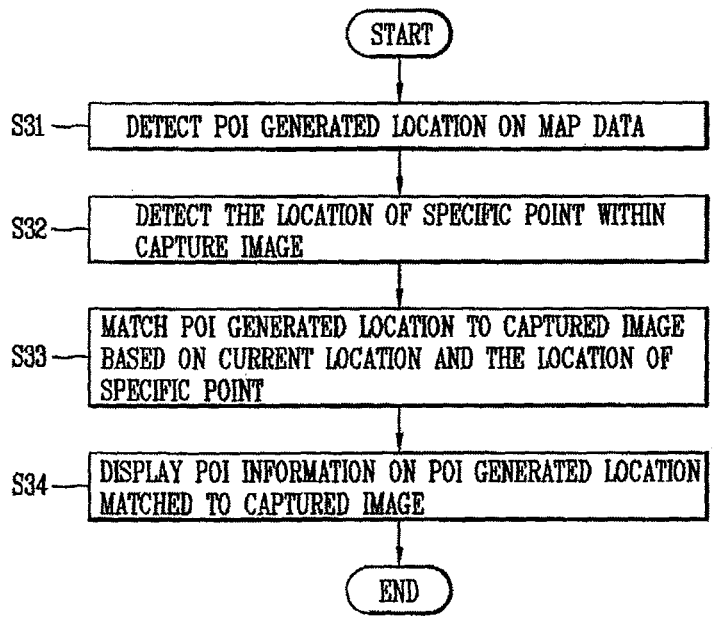
FIG. 10 is a flow chart illustrating an information (e.g., POI information) displaying method according to a third exemplary embodiment of the present invention.

FIG. 10 is a flow chart illustrating an information (e.g., POI information) displaying method according to the third exemplary embodiment of the present invention.

First, the controller 601 detects the location of a POI generated position (e.g., POI generated location) on the map data stored in the storage unit 604 based on a current location (for example, estimated vehicle location) (S31). For example, the controller 601 can detect the location of a POI generated position by detecting the distance and direction from the estimated vehicle location (e.g., current location) to a POI generated position on the map data stored in the storage unit 604 based on the estimated vehicle location.

The controller 601 generates a depth map of an image real-time captured through the capture unit 602, and detects (detects the location of a specific point) the distance and direction from the estimated vehicle location to a specific point within the captured image based on the generated depth map (S32). For example, the location of a target image corresponding to the specific point may be detected by detecting the distance and direction to a target image corresponding to the specific point within an image captured by the capture unit 602. The specific point may be randomly set. The depth map is a depth map of a stereo image captured through the capture unit 602.

The controller 601 matches the detected POI generated position (e.g., POI generated location) to the captured image based on a current location (e.g., estimated vehicle location) and the location of the specific point (S33). For example, the controller 601 knows the estimated vehicle location and the location of a specific point within the captured image, and thus the POI generated position can be matched to the captured image based on the estimated vehicle location and the location of a specific point. In other words, the controller 601 knows the estimated vehicle location and the location of a specific point within an image, and thus it is known at which location of the captured image a POI generated position within map data should be placed.

An image matched to the POI generated position (e.g., POI generated location) may be an interactive viewpoint image in which images captured by the first and the second camera are combined with each other, or may be an image captured by a third camera provided between the first and the second camera. Also, the image matched to the POI generated position may be either one of images captured by the two cameras.

The controller 601 displays POI information corresponding to the POI generated position on a POI generated position (e.g., POI generated location) matched to the captured image (S34).

As a result, an information displaying apparatus and method thereof according to the third exemplary embodiment of the present invention detects the location of a specific point within an image captured by a capture unit, matches POI information corresponding to a POI generated location on map data to the captured image based on the location of the specific point and a current location, and displays the matched result on the display unit, thereby accurately displaying the POI information on a captured actual image.

An information (e.g., event information) displaying method according to according to a fourth exemplary embodiment of the present invention will be described with reference to FIGS. 11 and 12.

Figure 11:
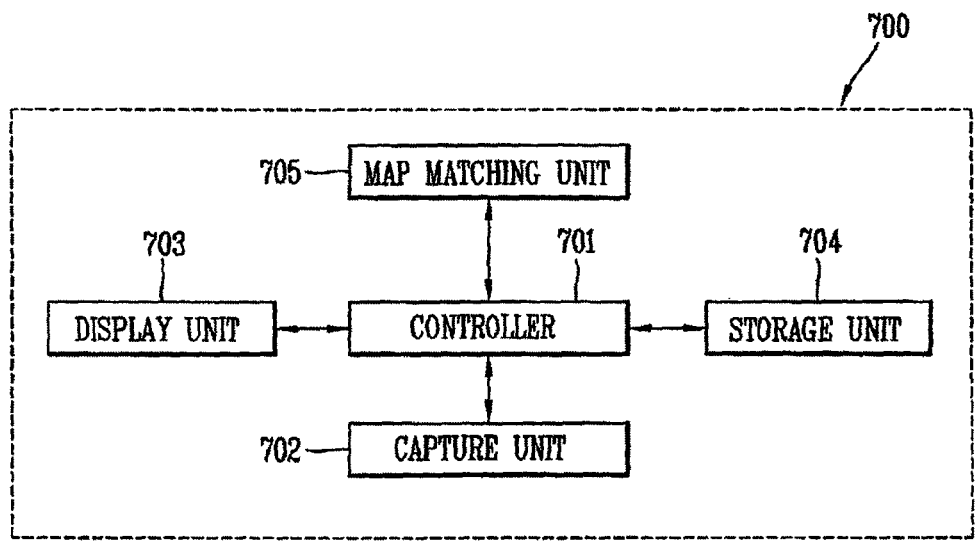
FIG. 11 is a block diagram illustrating an information (e.g., event information) displaying apparatus according to a fourth exemplary embodiment of the present invention.

FIG. 11 is a block diagram illustrating an information (e.g., event information) displaying apparatus according to the fourth exemplary embodiment of the present invention.

As illustrated in FIG. 11, an information (e.g., event information) displaying apparatus according to a fourth exemplary embodiment of the present invention may include a controller 701, a capture unit 702, a display unit 703, a storage unit 704, and a map matching unit 705. The controller 701 is configured to detect the location of a specific point within an image captured by the capture unit 702 and match road guide information corresponding to an event generated location on map data to the captured image based on the location of the specific point and a current location. The display unit 703 is configured to display the matched result. For example, the controller 701 detects an event generated location (e.g., coordinates) on the map data stored in a storage unit 704 based on a current location, and detects the location (e.g., coordinates) of a specific point within the captured image based on a depth map of the image captured by the capture unit 702 and the current location, and matches event information corresponding to the detected event generated location to the captured image based on the current location and the location of the specific point. The display unit 703 displays the matched result on a screen.

A map matching unit 705 matches a current location (for example, estimated vehicle location) to a map link (e.g., map-matched link or map-matched road) within the map data stored in the storage unit 704 when the current speed (for example, vehicle's current speed) is above a predetermined reference speed (for example, above 60 kmph), and outputs the matched map link (e.g., map-matched result). The controller 701 displays the matched map link (e.g., map-matched result) on the display unit 703. For example, since it may be difficult to process real-time images at high speed if a vehicle travels at high speed, the map matching unit 705 matches a current location (for example, estimated vehicle location) to a map link (e.g., map-matched link or map-matched road) within the map data stored in the storage unit 704 when the current speed is above a predetermined reference speed (for example, above 60 kmph), and displays the matched map link (e.g., map-matched result) on the display unit 703. The reference speed information may be a speed corresponding to when event information is unable to be real-time displayed on the captured image.

On the contrary, the map matching unit 705 matches event information corresponding to the detected event generated location to the captured image based on the current location and the location of the specific point when the current speed is less than a predetermined reference speed (for example, less than 60 kmph), and displays the matched result on the display unit 703.

FIG. 12 is a flow chart illustrating an information (e.g., event information) displaying method according to the fourth exemplary embodiment of the present invention.

First, the controller 701 detects the location of an event generated position (e.g., event generated location) on the map data stored in the storage unit 704 based on a current location (for example, estimated vehicle location) (S41). For example, the controller 701 can detect the location of an event generated position by detecting the distance and direction from the estimated vehicle location (e.g., current location) to an event generated position on the map data stored in the storage unit 704 based on the estimated vehicle location.

The controller 701 generates a depth map of an image real-time captured through the capture unit 702, and detects (detects the location of a specific point) the distance and direction from the estimated vehicle location to a specific point within the captured image based on the generated depth map (S42). For example, the location of a target image corresponding to the specific point may be detected by detecting the distance and direction to a target image corresponding to the specific point within an image captured by the capture unit. The specific point may be randomly set. The depth map is a depth map of a stereo image captured through the capture unit 702.

The controller 701 matches the detected event generated position (e.g., event generated location) to the captured image based on a current location (e.g., estimated vehicle location) and the location of the specific point (S43). For example, the controller 701 knows the estimated vehicle location and the location of a specific point within the captured image, and thus the event generated position can be matched to the captured image based on the estimated vehicle location and the location of a specific point. In other words, the controller 701 knows the estimated vehicle location and the location of a specific point within an image, and thus it is known at which location of the captured image an event generated position within map data should be placed.

An image matched to the event generated position (e.g., event generated location) may be an interactive viewpoint image in which images captured by the first and the second camera are combined with each other, or may be an image captured by a third camera provided between the first and the second camera. Also, the image matched to the event generated position may be either one of images captured by the two cameras.

The controller 701 displays event information (e.g., road guide information or POI information) corresponding to the event generated position on an event generated position (e.g., event generated location) matched to the captured image (S44).

The controller 701 determines whether the current speed (for example, vehicle's current speed) is above a predetermined reference speed (for example, above 60 kmph) (S45). The predetermined reference speed may be changed by the designer.

The controller 701 generates a control signal when the current speed is above a predetermined reference speed, and outputs the control signal to the map matching unit 705.

The map matching unit 705 matches a current location (for example, estimated vehicle location) to a map link (e.g., map-matched link or map-matched road) within the map data stored in the storage unit 704 based on the control signal (control signal generated when the current speed is above a predetermined reference speed (for example, above 60 kmph)) (S46), and displays the matched map link (e.g., map-matched result) on the display unit 703 (S47). For example, since it may be difficult to process real-time images at high speed if a vehicle travels at high speed, the map matching unit 705 matches a current location (for example, estimated vehicle location) to a map link (e.g., map-matched link or map-matched road) within the map data stored in the storage unit 704 when the current speed is above a predetermined reference speed (for example, above 60 kmph), and displays the matched map link (e.g., map-matched result) on the display unit 703. The reference speed information may be a speed corresponding to when event information is unable to be real-time displayed on the captured image.

On the contrary, the map matching unit 705 matches event information corresponding to the detected event generated location to the captured image based on the current location and the location of the specific point when the current speed is less than a predetermined reference speed (for example, less than 60 kmph), and displays the matched result on the display unit 703.

As a result, an information displaying apparatus and method thereof according to the fourth exemplary embodiment of the present invention displays event information (for example, road guide information or POI information) together with the captured image on the display unit based on a current speed and a predetermined reference speed, or displays map data matched to the current location on the display unit, thereby easily providing event information (for example, road guide information and/or POI information) regardless of the current speed to the user.

An information (e.g., event information) displaying method according to according to a fifth exemplary embodiment of the present invention will be described with reference to FIGS. 11 and 13.

FIG. 13 is a flow chart illustrating an information (e.g., event information) displaying method according to the fifth exemplary embodiment of the present invention.

First, the controller 701 detects the location of an event generated position (e.g., event generated location) on the map data stored in the storage unit 704 based on a current location (for example, estimated vehicle location) (S51). For example, the controller 701 can detect the location of an event generated position by detecting the distance and direction from the estimated vehicle location (e.g., current location) to an event generated position on the map data stored in the storage unit 704 based on the estimated vehicle location.

The controller 701 generates a depth map of an image real-time captured through the capture unit 702, and detects (detects the location of a specific point) the distance and direction from the estimated vehicle location to a specific point within the captured image based on the generated depth map (S52). For example, the location of a target image corresponding to the specific point may be detected by detecting the distance and direction to a target image corresponding to the specific point within an image captured by the capture unit. The specific point may be randomly set. The depth map is a depth map of a stereo image captured through the capture unit 702. The controller 701 matches the detected event generated position (e.g., event generated location) to the captured image based on a current location (for example, estimated vehicle location) and the location of the specific point (S53). For example, the controller 701 knows the estimated vehicle location and the location of a specific point within the captured image, and thus the event generated position can be easily matched to the captured image based on the estimated vehicle location and the location of a specific point. In other words, the controller 701 knows the estimated vehicle location and the location of a specific point within an image, and thus it is easily known at which location of the captured image an event generated position within map data should be placed.

An image matched to the event generated position (e.g., event generated location) may be an interactive viewpoint image in which images captured by the first and the second camera are combined with each other, or may be an image captured by a third camera provided between the first and the second camera. Also, the image matched to the event generated position may be either one of images captured by the two cameras.

The controller 701 displays event information (e.g., road guide information or POI information) corresponding to the event generated position on an event generated position (e.g., event generated location) matched to the captured image (S54).

On the other hand, the controller 701 may receive event information (for example, road guide information and/or POI information) corresponding to the event generated position from the server (not shown) through a wireless communication network.

The controller 701 determines whether the signal intensity of the event information (for example, road guide information and/or POI information) is above a predetermined reference speed (for example, signal intensity capable of receiving road guide information or POI information) (S55). The predetermined reference speed may be changed by the designer.

The controller 701 generates a control signal when the signal intensity of the event information (for example, road guide information and/or POI information) is above a predetermined reference speed, and outputs the control signal to the map matching unit 705.

A map matching unit 705 matches a current location (for example, estimated vehicle location) to a map link (e.g., map-matched link or map-matched road) within the map data stored in the storage unit 704 based on the control signal (S56), and displays the matched map link (e.g., map-matched result) (including POI information) on the display unit 703 (S57).

In other words, the controller 701 matches event information corresponding to the detected event generated location to the captured image based on the current location and the location of the specific point, based on the intensity of a reception signal when receiving POI information and road guide information through a communication network, and displays the matched result on the display unit 703, or displays map data matched to the current location on the display unit.

For example, the controller 701 matches event information corresponding to the detected event generated location to the captured image based on the current location and the location of the specific point if the intensity of the reception signal of event information (e.g., POI information and/or road guide information) is above a predetermined reference value when receiving the event information (e.g., POI information and/or road guide information) through a communication network, and displays the matched result on the display unit 703.

On the other hand, the controller 701 displays map data matched to the current location on the display unit if the intensity of the reception signal of event information (e.g., POI information and/or road guide information) is less than a predetermined reference value when receiving the event information (e.g., POI information and/or road guide information) through a communication network.

As a result, an information displaying apparatus and method thereof according to the fifth exemplary embodiment of the present invention displays event information (for example, road guide information and/or POI information) together with the captured image on the display unit based on a reception intensity of the event information and a predetermined reference value, or displays event information matched to the current location on the display unit, thereby easily providing event information (for example, road guide information and/or POI information) regardless of the reception intensity of the event information to the user.

As described above, an information displaying apparatus and method thereof according to exemplary embodiments of the present invention detects the location of a specific point within an image captured by a capture unit, matches event information corresponding to an event generated location on map data to the captured image based on the location of the specific point and a current location, and displays the matched result on the display unit, thereby accurately displaying the event information on a captured actual image.

An information displaying apparatus and method thereof according to exemplary embodiments of the present invention detects the location of a specific point within an image captured by a capture unit, matches road guide information corresponding to a road guide generated location on map data to the captured image based on the location of the specific point and a current location, and displays the matched result on the display unit, thereby accurately displaying the road guide information on a captured actual image.

An information displaying apparatus and method thereof according to a exemplary embodiments of the present invention detects the location of a specific point within an image captured by a capture unit, matches POI information corresponding to a POI generated location on map data to the captured image based on the location of the specific point and a current location, and displays the matched result on the display unit, thereby accurately displaying the POI information on a captured actual image.

An information displaying apparatus and method thereof according to exemplary embodiments of the present invention displays event information (for example, road guide information or POI information) together with the captured image on the display unit based on a current speed and a predetermined reference speed, or displays map data matched to the current location on the display unit, thereby easily providing event information (for example, road guide information and/or POI information) regardless of the current speed to the user.

An information displaying apparatus and method thereof according to exemplary embodiments of the present invention displays event information (for example, road guide information and/or POI information) together with the captured image on the display unit based on a reception intensity of the event information and a predetermined reference value, or displays event information matched to the current location on the display unit, thereby easily providing event information (for example, road guide information and/or POI information) regardless of the reception intensity of the event information to the user.

It will be apparent to those skilled in this art that various changes and modifications may be made thereto without departing from the gist of the present invention. Accordingly, it should be noted that the exemplary embodiments disclosed in the present invention are only illustrative and not limitative to the spirit of the present invention, and the scope of the spirit of the present invention is not limited by those exemplary embodiments. The scope protected by the present invention should be construed by the accompanying claims, and all the spirit within the equivalent scope of the present invention should be construed to be included in the scope of the right of the present invention.

What is claimed is:

1. An information displaying apparatus in a vehicle, the apparatus comprising:

a first camera and a second camera horizontally arranged to respectively capture a first image and a second image;

a display unit; and a controller configured to:

detect a turn information generated location on map data based on a current location of the vehicle, the map data stored in a memory of the information displaying apparatus, generate a depth map by comparing a portion of the first image captured by the first camera to a portion of the second image captured by the second image and estimating a variation between the portion of the first image and the portion of the second image, generate an interactive viewpoint image by combining the first image and the second image, detect a location of a specific point within the interactive viewpoint image based on the depth map and the current location, detect the distance and direction to a target image corresponding to the specific point, match road guide information corresponding to the detected turn information generated location to the interactive viewpoint image based on the current location and the location of the specific point, display, on the display unit, the road guide information on a road within the interactive viewpoint image, detect a current speed of the vehicle, display, on the display unit, a road map without the interactive viewpoint image and including the current location of the vehicle based on the current speed of the vehicle being greater than a predetermined reference speed, display, on the display unit, the road guide information and the interactive viewpoint image including event information based on the current speed of the vehicle being less than the predetermined reference speed, the predetermined reference speed being a speed corresponding to when the event information is unable to be real-time displayed, match the current location to the road map within the map data when a reception intensity of the road guide information received via a communication network is less than a predetermined reference value, and display, on the display unit, the road guide information and the interactive viewpoint image when the reception intensity of the road guide information is above the predetermined reference value.

2. The apparatus of claim 1, wherein the controller is further configured to match point of interest information on the map data to the interactive viewpoint image and display, on the display unit, the point of interest information and the interactive viewpoint image.

3. The apparatus of claim 1, wherein the first image is a left view image and the second image is a right view image.

4. The apparatus of claim 1, further comprising:

a third camera configured to capture a third image, the third camera being located between the first camera and the second camera, wherein the controller is further configured to match the road guide information corresponding to the detected turn information generated location to the third image based on the current location and the location of a specific point within the third image.

5. The apparatus of claim 1, wherein the event information includes point of interest information.

\* \* \* \* \*